United States Patent
Kamiya et al.

[11] Patent Number: 5,854,612
[45] Date of Patent: Dec. 29, 1998

[54] METHOD AND APPARATUS FOR CONTROLLING ARRAY ANTENNA

[75] Inventors: Yukihiro Kamiya, Saitama; Shinichi Nomoto; Hideo Kobayashi, both of Tokyo, all of Japan

[73] Assignee: Kokusai Denshin Denwa Co., Ltd., Tokyo, Japan

[21] Appl. No.: 20,540

[22] Filed: Feb. 9, 1998

[30] Foreign Application Priority Data

Feb. 13, 1997 [JP] Japan ................................. 9-042877

[51] Int. Cl.$^6$ ............................. G01S 3/16; G01S 3/28
[52] U.S. Cl. .......................... 342/383; 342/380; 342/442
[58] Field of Search .................................. 342/442, 380, 342/383

[56] References Cited

U.S. PATENT DOCUMENTS 5,274,386  12/1993  Pellon ..................................... 342/380
5,321,410  6/1994   Hipp et al. ............................. 342/442

OTHER PUBLICATIONS

"Developments and Prospects of Adaptive Antenna Theories", Ogawa et al, *Trans. of IEICE*, B–II vol. J75–B–II, No. 11, Nov. 1992, pp. 721 –732.

"High–Resolution Techniques in Signal Processing Antennas", Ogawa et al, *IEICE Trans. Commun.*, vol. E78–B, No. 11, Nov. 1995, pp. 1435 –1441.

*Primary Examiner*—Theodore M. Blum
*Attorney, Agent, or Firm*—Nikaido, Marmelstein, Murray & Oram LLP

[57] ABSTRACT

A method of controlling an array antenna having a plurality of antenna elements for providing antenna output signals by receiving TDMA burst signals. The method includes a step of estimating a DOA of incident signal based upon the antenna output signals, a step of calculating weights with reference to the estimated DOA, a step of multiplying the antenna output signals by the calculated weights, respectively, and a step of summing the multiplied antenna output signals. The estimating step includes a first step of calculating a phase difference between the output signals of the two antenna elements during burst, a second step of calculating a phase difference between the output signals of the two antenna elements during an interval of bursts, and a third step of calculating a difference between the calculated phase differences.

19 Claims, 4 Drawing Sheets

METHOD AND APPARATUS FOR CONTROLLING ARRAY ANTENNA

FIELD OF THE INVENTION

The present invention relates to a method and an apparatus for controlling an array antenna used in various radio communications. Particularly, the present invention relates to an array antenna control method and apparatus which adopt a novel algorithm for estimating DOA (Direction Of Arrival) of TDMA (Time Division Multiple Access) burst waves.

DESCRIPTION OF THE RELATED ART

An array antenna with a plurality of antenna elements arranged at predetermined positions can increase its directivity and can decrease its sensitivity toward a certain direction to null by controlling the excitation of each of the antenna elements. When the array antenna is utilized as a receiving antenna, DOA of incident signals can be estimated by detecting the phase differences between received plane waves, which differences are caused by different physical locations of its respective antenna elements.

There are many control algorithms for adaptively controlling excitation of the antenna elements of the array antenna so as to utilize it as a space filter for removing possible interference. These array antenna control algorithms under TDMA systems require particular consideration due to fact that they employ intermittent signals. HA (Howells-Applebaum) algorithm is one of the control algorithms which utilize an estimated DOA as a reference signal. Thus, it is expected that the HA algorithm is suitable for TDMA systems. This HA algorithm is described in detail in Y. Ogawa and N. Kikuma, "Developments and Prospects of Adaptive Antenna Theories", Trans. of IEICE B-II Vol.J75-B-II No.11, pp.721–732, November 1992.

As aforementioned, the HA algorithm utilizes the DOA of the desired signal as a reference of control. The optimal weights obtained by the HA algorithm are expressed as follows:

$$W_{opt}=R_{xx}^{-1}S^* \text{ or } W_{opt}=R_{uu}^{-1}S^* \quad (1)$$

where $R_{xx}$ and $R_{uu}$ are the covariance matrices of the signal shown as follows:

$$R_{xx}=E[\{X_s(t)+X_i(t)+X_n(t)\}^*\{X_s(t)+X_i(t)+X_n(t)\}^T]$$

$$R_{uu}=E[\{X_i(t)+X_n(t)\}^*\{X_i(t)+X_n(t)\}^T] \quad (2)$$

where $X_s(t)$ is a desired signal, $X_i(t)$ is an interferer and $X_n(t)$ is a noise indicated by column vectors, respectively. In the equations (2), suffix T denotes a transposed matrix, suffix * denotes a complex conjugate and E[ ] denotes an expectation (ensemble average). In the equation (1), S is the steering vector indicating the relative phase of the incident signal at each element with respect to the reference element. In an equally spaced linear array, the steering vector S is expressed as:

$$S=[s_1\ s_2\ \ldots\ s_m]^T$$

$$s_n=2(m-1)\pi d \sin\theta/\lambda \quad (3)$$

where d is a spacing of elements, $\lambda$ is a wave length of the received signal and $\theta$ is an arrival angle from the vertex.

The optimal weights can also be obtained by the recursive solution such as a steepest, descent method. Nevertheless, the direct solution obtaining the optimum weights by using the inversion computation as shown above is desired. This is because according to the recursive solution, converging speed will be susceptible to the radio environment. Whereas according to the direct solution, no such problem will occur but the load of the computer for the inversion computation will greatly increase.

In order to adopt the HA algorithm for the array antenna control, it is necessary to estimate the DOA of the incident signal. The MUSIC algorithm is one of various DOA estimation algorithms. According to this algorithm, the DOA of the incident signal can be effectively estimated by utilizing that the eigenvector corresponding to the minimum eigenvalue of $R_x$ is at right angles with $S^*$. The MUSIC algorithm is described in detail in Y. Ogawa and N. Kikuma, "High-Resolution Techniques in Signal Processing Antenna", IEICE Trans. Commun. Vol.E78-B No.11, pp.1435–1441, November 1995.

However, this MUSIC algorithm is very complicated and requires heavy computational load for executing such as the eigenvalue resolution of the covariance matrices. Although the MUSIC algorithm can provide a precise DOA of the incident signal under good conditions, the array antenna control applied to the mobile communication does not require so precise information of the DOA in practical.

SUMMARY OF THE INVENTION

Under these circumstances, it is desired to estimate a DOA of the incident signal by means of a simple computation at penalties in precision and to compute optimal weights with respect to the estimated DOA at high speed.

It is therefore an object of the present invention to provide a method and an apparatus for controlling an array antenna, whereby a DOA of a desired intermittent signal such as TDMA burst signal can be estimated by means of a simple method even if the desired signal includes continuous interferers and directional noises, and thus the array antenna can be adaptively controlled for the circumstances based upon the estimated DOA.

According to the present invention, a method of controlling an array antenna having a plurality of antenna elements for providing antenna output signals by receiving TDMA burst signals is provided. The method includes a step of estimating a DOA of incident signal based upon the antenna output signals, a step of calculating weights with reference to the estimated DOA, a step or multiplying the antenna output signals by the calculated weights, respectively, and a step of summing the multiplied antenna output signals. The estimating step includes a first step of calculating a phase difference between the output signals of the two antenna elements during burst, a second step of calculating a phase difference between the output signals of the two antenna elements during an interval of bursts, and a third step of calculating a difference between the calculated phase differences.

As mentioned before, the HA algorithm utilizes a DOA of the desired signal as a reference of control without using the signal itself as a reference signal. Thus, this algorithm needs no mechanism for decoding or estimating the reference signal. However, it is necessary for estimating the DOA. According to the present invention, since the DOA estimation is executed by positively utilizing information during an interval of TDMA bursts, the load of computer for the DOA estimation can be reduced. As a result, the ability of computer to calculate weights for controlling the array antenna can be enhanced to realize a high speed array antenna control which is suitable for TDMA systems.

It is preferred that the first step includes a step of calculating a time average of the phase difference between the output signals of the two antenna elements during burst, and that the second step includes a step of calculating a time average of the phase difference between the output signals of the two antenna elements during an interval of bursts.

It is also preferred that the third step includes a step of temporally storing one of the calculated phase differences, and a step of calculating a difference between the stored phase difference and the other one of the calculated phase differences.

In an embodiment of the present invention, one of the antenna elements is determined to a reference antenna element. The first step may include a step of calculating the product of $X_0^* X_1$, where $X_0^*$ is a complex conjugate of the output signal from the reference antenna element during burst, and $X_1$ is the output signal of the antenna element adjacent to the reference antenna element during burst, and the second step may include a step of calculating the product of $X_0^* X_1$, where $X_0^*$ is a complex conjugate of the output signal from the reference antenna element during an interval of bursts, and $X_1$ is the output signal of the antenna element adjacent to the reference antenna element during an interval of bursts.

In this case, the first step includes a step of calculating the product of:

$$X_0^* X_1 = A_D^2 e^{j\alpha_D} + A_D A_I e^{j[(\omega_I - \omega_D)t + (\phi_I - \phi_D) + \alpha_I]} + A_D A_I e^{j[(\omega_D - \omega_I)t + (\phi_D - \phi_I) + \alpha_D]} + A_I^2 e^{j\alpha_I}$$

where $A_D$ and $A_I$ are amplitude, $\omega_D$ and $\omega_I$ are angular carrier frequency, and $\phi_D$ and $\phi_I$ are the sum of initial phase and modulation phase, suffixes D and I are a desired signal and an interferer, and $\alpha_D$ and $\alpha_I$ are phase differences from the reference antenna element caused by $\theta_D$ and $\theta_I$ of:

$\alpha_D = 2\pi d \sin \theta_D / \lambda$ $\alpha_I = 2\pi d \sin \theta_I / \lambda$ where $\theta_D$ and $\theta_I$ are angles of arrival of the desired signal and the interferer, d is a distance between the reference antenna element and the adjacent antenna element, and $\lambda$ is a wave length of the incident signal, and the second step includes a step of calculating the product of:

$$X_0^* X_1 = A_I e^{-j(\omega_I t + \phi_I)} A_I e^{j(\omega_I t + \phi_I + \alpha_I)} = A_I^2 e^{j\alpha_I}$$

It is preferred that the method further includes a step of detecting a TDMA slot timing in accordance with the antenna output signals, and a step of judging whether it is burst or an interval of bursts by using the detected TDMA slot timing.

It is also preferred that the estimating step includes a fourth step of estimating a DOA based upon phase differences of a plurality of element pairs having the same spacing, and a fifth step of calculating spatial average of the estimated DOA.

It is further preferred that the estimating step includes a fourth step of estimating a DOA based upon phase differences of a plurality of element pairs having different spacings, and a fifth step of calculating spatial average of the estimated DOA. In this case, a linear regression line representing the relationship between the element spacing (distance of elements) and the phase difference is calculated by using all the phase difference information detected with respect to all the available element spacings. Since this regression line is equivalent to a set of amended values of phase difference information separately obtained for each element spacing by using the phase different information of all the available element spacings, the accuracy of the phase difference detection which may deteriorate due to lowered S/N can be improved by this calculation.

It is preferred that the method further includes a step of adding a feedback value to the estimated DOA to produce a sum, a step of delaying the sum, and a step of multiplying the delayed sum by a predetermined constant to produce the feedback value, the sum being provided as the estimated DOA. When no burst is temporarily received due to a hindrance, it is possible to correctly estimate the DOA by using the old DOA information already estimated.

According to the present invention, furthermore, an apparatus for controlling an array antenna having a plurality of antenna elements for providing antenna output signals by receiving TDMA burst signals is provided. The apparatus includes a circuit for estimating a DOA of incident signal based upon the antenna output signals, a circuit for calculating weights with reference to the estimated DOA, a circuit for multiplying the antenna output signals by the calculated weights, respectively, and a circuit for summing the multiplied antenna output signals. The estimating circuit includes a first circuit for calculating a phase difference between the output signals of the two antenna elements during burst, a second circuit for calculating a phase difference between the output signals of the two antenna elements during an interval of bursts, and a third circuit for calculating a difference between the calculated phase differences.

It is preferred that the first circuit includes a circuit for calculating a time average of the phase difference between the output signals of the two antenna elements during burst, and that the second circuit includes a circuit for calculating a time average of the phase difference between the output signals of the two antenna elements during an interval of bursts.

It is also preferred that the third circuit includes a circuit for temporally storing one of the calculated phase differences, and a circuit for calculating a difference between the stored phase difference and the other one of the calculated phase differences.

In an embodiment of the present invention, one of the antenna elements is determined to a reference antenna element. The first circuit may include a circuit for calculating the product of $X_0^* X_1$, where $X_0^*$ is a complex conjugate of the output signal from the reference antenna element during burst, and $X_1$ is the output signal of the antenna element adjacent to the reference antenna element during burst, and the second circuit may include a circuit for calculating the product of $X_0^* X_1$, where $X_0^*$ is a complex conjugate of the output signal from the reference antenna element during an interval of bursts, and $X_1$ is the output signal of the antenna element adjacent to the reference antenna element during an interval of bursts.

In this case, the first circuit includes a circuit for calculating the product of:

$$X_0^* X_1 = A_D^2 e^{j\alpha_D} + A_D A_I e^{j[(\omega_I - \omega_D)t + (\phi_I - \phi_D) + \alpha_I]} + A_D A_I e^{j[(\omega_D - \omega_I)t + (\phi_D - \phi_I) + \alpha_D]} + A_I^2 e^{j\alpha_I}$$

where $A_D$ and $A_I$ are amplitude, $\omega_D$ and $\omega_I$ are angular carrier frequency, and $\phi_D$ and $\phi_I$ are the sum of initial phase and modulation phase, suffixes D and I are a desired signal and an interferer, and $\alpha_D$ and $\alpha_I$ are phase differences from the reference antenna element caused by $\theta_D$ and $\theta_I$ of:

$\alpha_D = 2\pi d \sin \theta_D / \lambda$ $\alpha_I = 2\pi d \sin \theta_I / \lambda$ where $\theta_D$ and $\theta_I$ are angles of arrival of the desired signal and the interferer, d is a distance between the reference antenna element and the adjacent antenna element, and λ is a wave length of the incident signal, and the second circuit includes a circuit for calculating the product of:

$$X_0^* X_1 = A_l e^{-j(\omega_l t + \phi_l)} A_l e^{j(\omega_l t + \phi_l + \alpha_l)} = A_l^2 e^{j\alpha_l}$$

It is preferred that the apparatus further includes a circuit for detecting a TDMA slot timing in accordance with the antenna output signals, and a circuit for judging whether it is burst or an interval of bursts by using the detected TDMA slot timing.

It is also preferred that the estimating circuit includes a fourth circuit for estimating a DOA based upon phase differences of a plurality of element pairs having the same spacing, and a fifth circuit for calculating spatial average of the estimated DOA.

It is further preferred that the estimating circuit includes a fourth circuit for estimating a DOA based upon phase differences of a plurality of element pairs having different spacings, and a fifth circuit for calculating spatial average of the estimated DOA.

It is preferred that the apparatus further includes a circuit for adding a feedback value to the estimated DOA to produce a sum, a circuit for delaying the sum, and a circuit for multiplying the delayed sum by a predetermined constant to produce the feedback value, the sum being provided as the estimated DOA.

According to the present invention, furthermore, an apparatus for controlling an array antenna having a plurality of antenna elements for providing antenna output signals by receiving TDMA burst signals is provided. The apparatus includes a circuit for estimating a DOA of incident signal based upon the antenna output signals, a circuit for calculating weights with reference to the estimated DOA, a circuit for multiplying the antenna output signals by the calculated weights, respectively, and a circuit for summing the multiplied antenna output signals. The estimating circuit includes a circuit for calculating phase differences between the output signals of the two antenna elements, a circuit for calculating a spatial average of the calculated phase differences during burst, a circuit for calculating a spatial average of the calculated phase differences during an interval of bursts, and a circuit for calculating a difference between the calculated spatial averages of phase differences.

Further objects and advantages of the present invention will be apparent from the following description of the preferred embodiments of the invention as illustrated in the accompanying drawings.

DESCRIPTION OF THE PREFERRED EMBODIMENTS

Although an array antenna control apparatus according to the present invention is applicable to a two-dimensional array antenna, the following embodiments relate to a control apparatus applied to a linear array antenna (equally spaced linear array antenna) in order to simplify the explanation.

Figure 1:
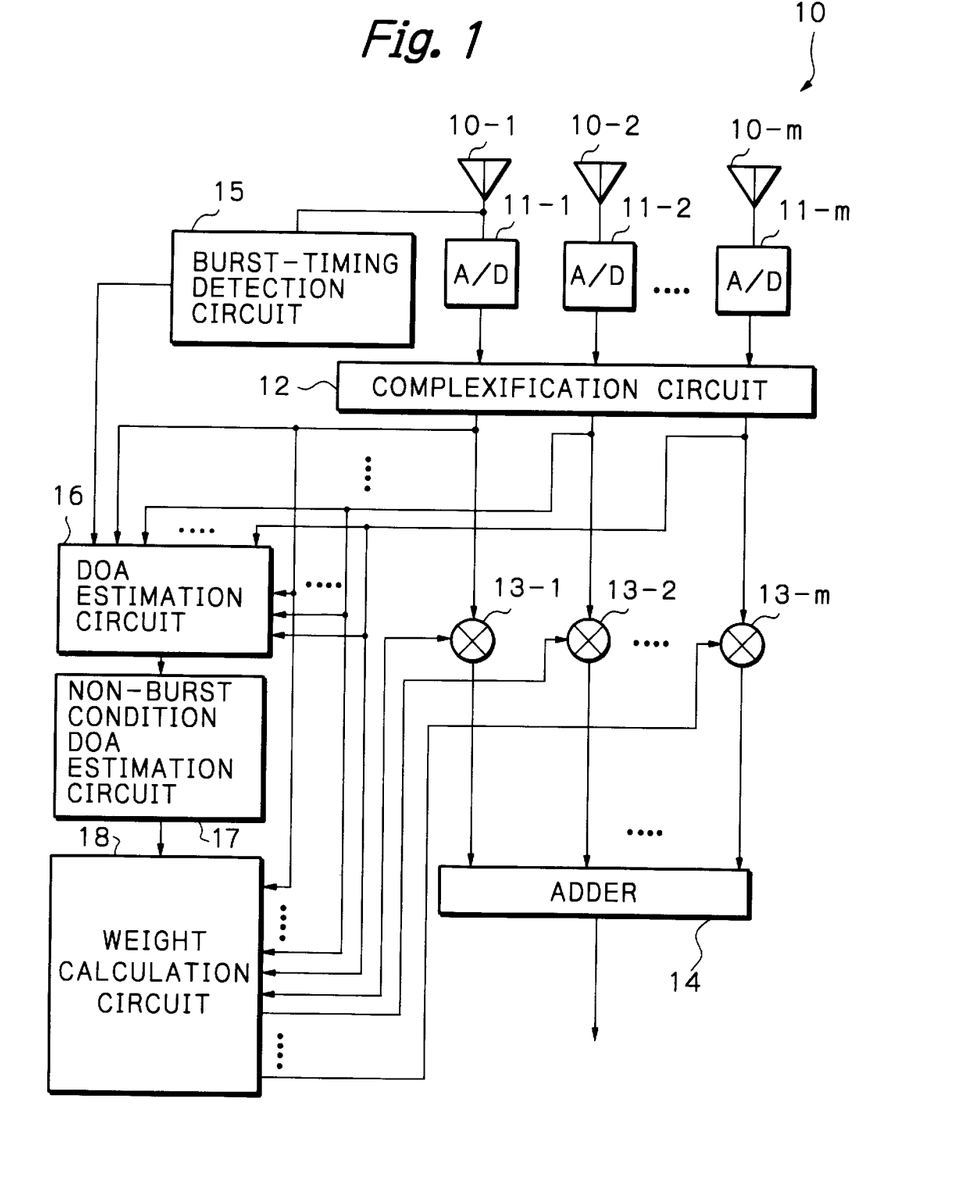
FIG. 1 shows a block diagram schematically illustrating a configuration of a preferred embodiment of a control apparatus for controlling an array antenna with a plurality of antenna elements according to the present invention.

FIG. 1 schematically illustrates a control apparatus for controlling an array antenna 10 having a plurality of antenna elements 10-1 to 10-m as a preferred embodiment according to the present invention.

In the figure, reference numerals 11-1 to 11-m denote A/D (Analog/Digital) converters for converting analog output signals from the antenna elements 10-1 to 10-m into digital signals, 12 denotes a complexification circuit for producing complex signals of converted digital signals from the A/D converters 11-1 to 11-m, 13-1 to 13-m denote multipliers for multiplying complex signals from the complexification circuit 12 by weights, respectively, 14 denotes an adder for summing weighted output signals from the multipliers 13-1 to 13-m, 15 denotes a burst-timing detection circuit, 16 denotes a DOA estimation circuit, 17 denotes a DOA estimation circuit for non-burst condition, and 18 denotes a weight calculation circuit.

The output signals from the antenna elements 10-1 to 10-m are sampled at a predetermined sampling interval and converted into the digital signals in the respective A/D converters 11-1 to 11-m. Then, in the complexification circuit 12, the converted digital signals are separated into orthogonal components to produce the complex signals, respectively. In the multipliers 13-1 to 13-m, the respective complex signals are multiplied by the corresponding weights and then the weighted results are summed in the adder 14.

On the assumption that the antenna element 10-1 is a reference antenna element, the output signal from this reference element 10-1 is applied to the burst-timing detection circuit 15 to detect the timing of bursts by detecting the TDMA slot timing. Namely, whether it is a burst or an interval of bursts can be judged by detecting the TDMA slot timing. The detected burst timing is provided to the DOA estimation circuit 16. To the DOA estimation circuit 16, the output signals from the respective elements 10-1 to 10-m are also provided via the A/D converters 11-1 to 11-m and via the complexification circuit 12.

The output signal from the DOA estimation circuit 16 is provided to the non-burst condition DOA estimation circuit 17 so as to estimate the DOA of the incident signal when no burst is received. If the array antenna is mounted on a mobile terminal, no burst may be temporarily received due to a hindrance. During such period of time, the non-burst condition DOA estimation circuit 17 estimates the DOA of the incident signal in accordance with the already estimated DOA. The configuration of this circuit 17 will be described in detail later.

The DOA estimation circuit 16 needs at least one burst signal and an interval of bursts during which no burst signal exists, in order to obtain a DOA estimation result. Therefore, output time period of the DOA estimation result will be equal to the sum of one burst length and one interval of bursts. The signal indicating the estimated DOA is applied to the weight calculation circuit 18, and then weights are calculated based upon the estimated DOA by using the HA algorithm. A time interval with which the estimated DOA is provided to the weight calculation circuit 18 is equal to the output period of the DOA estimation result from the DOA estimation circuit 16 namely equal to the sum of one burst length and one interval of bursts. Thus, the weight calculation circuit 18 outputs the weights at a time interval equal to the sampling period and updates at the same time interval equal to the sum of one burst length and one burst interval.

Namely, the weights are repeatedly held and updated with this time period.

Figure 2:
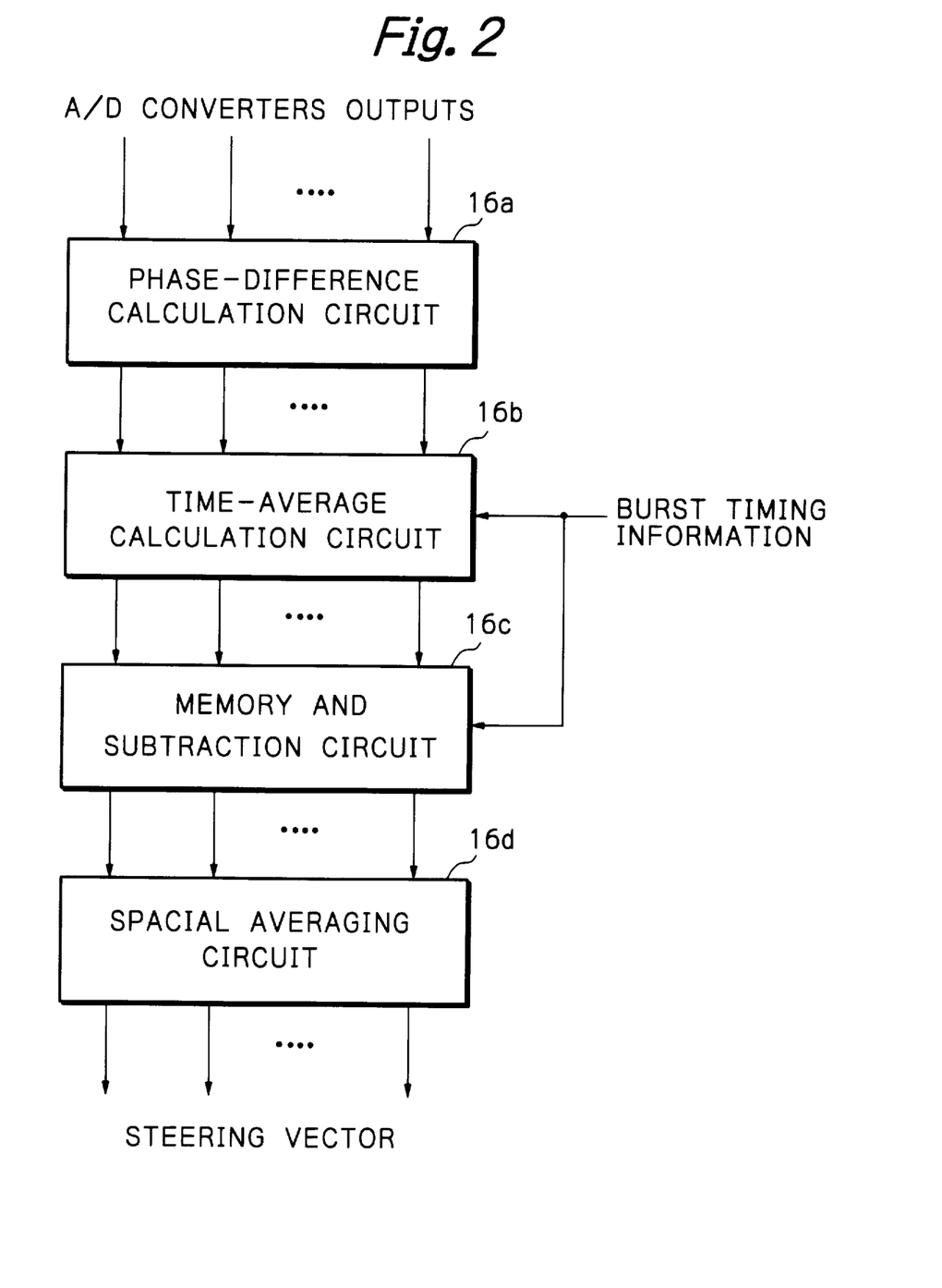
FIG. 2 shows a block diagram of an example of a DOA estimation circuit according to the embodiment shown in FIG. 1.

FIG. 2 illustrates an example of the DOA estimation circuit 16 according to the embodiment shown in FIG. 1. In the figure, reference numeral 16a denotes a phase-difference calculation circuit for calculating phase differences between the received signals at the respective antenna elements 10-1 to 10-m, 16b denotes a time-average calculation circuit for calculating average values of the calculated phase differences with respect to time, 16c denotes a memory and subtraction circuit constituted by a memory for storing the time averaged values of the phase differences during a time period of burst and a subtraction circuit for calculating a difference between the time averaged values stored in the memory and input time averaged values during a time period of an interval of bursts, and 16d denotes a spatial averaging circuit.

In the phase-difference calculation circuit 16a, phase differences between the received signals of the respective antenna elements 10-1 to 10-m due to differences of the physical locations of the respective antenna elements are calculated based upon the following theory.

The phase difference between the received signal of a reference element and the received signal of the adjacent element apart from the reference element by a distance d can be obtained from the product of a complex conjugate of the reference element output signal $X_0^*$ and the adjacent element output signal $X_1$ as follows:

$$X_0^* X_1 = A_0 e^{-j(\omega t + \phi)} A_1 e^{j\left(\omega t + \phi + \frac{2\pi d}{\lambda} \sin\theta\right)} \quad (4)$$

$$= A_0 A_1 e^{j\left(\frac{2\pi d}{\lambda} \sin\theta\right)}$$

where $A_0$ and $A_1$ are amplitudes of the reference element output signal and the adjacent element output signal, $\omega$ is an angular frequency of the signal, $\phi$ is the sum of initial phase and modulation phase of the signal, $\lambda$ is a wave length of the signal, and $\theta$ is a incident angle of the signal.

Thus, the angle of the incident signal can be relatively easily obtained by calculating the phase differences between the received signals of the antenna elements. However, the DOA cannot be detected by this method when the output signals of the elements include not only the desired signal but also interferers and so on. Thus, in the embodiment, the following operations are executed in the circuits 16b and 16c.

The output signals indicating the calculated phase differences from the phase-difference calculation circuit 16a are applied to the time-average calculation circuit 16b. To the circuit 16b, burst timing information detected by the burst-timing detection circuit 15 is simultaneously applied. The circuit 16b starts the calculation of time average of the outputs from the circuit 16a when it knows that there exists a desired signal, namely a burst signal, based upon the applied burst timing information, and then outputs the computed result of time averaged values to the memory and subtraction circuit 16c when it detects that the burst period is ended (when it detects that it is during an interval of bursts) based upon the applied burst timing information. While the burst exists, the applied phase differences are equal to the sum of the phase differences of the desired signals and the phase differences of the interferers. The product of complex conjugate of the reference element output signal $X_0^*$ and the adjacent element output signal $X_1$ during burst is expressed as follows:

$$X_0^* X_1 = A_D^2 e^{j\alpha_D} + A_D A_I e^{j[(\omega_I - \omega_D)t + (\phi_I - \phi_D) + \alpha_I]} + A_D A_I e^{j[(\omega_D - \omega_I)t + (\phi_D - \phi_I) + \alpha_D]} + A_I^2 e^{j\alpha_I} \quad (5)$$

where $A_D$ and $A_I$ are amplitude, $\omega_D$ and $\omega_I$ are angular carrier frequency, and $\phi_D$ and $\phi_I$ are the sum of the initial phase and the modulation phase. The suffixes D and I are the desired signal and the interferer, respectively. Furthermore, $\alpha_D$ and $\alpha_I$ are phase differences from the reference element caused by $\theta_D$ and $\theta_I$ as follows:

$$\alpha_D = 2\pi d \sin\theta_D/\lambda$$

$$\alpha_I = 2\pi d \sin\theta_I/\lambda$$

where $\theta_D$ and $\theta_I$ are incident angles of a desired signal and an interferer, respectively, d is the distance between two elements and $\lambda$ is a wave length of the received signal.

Thus, the DOA of the desired signal can be known by calculating $\alpha_D$. In this case, it is assumed that the desired signal is TDMA burst signal but the interferer is continuous. Also, terms of additive Gaussian noise are omitted for the simplicity of the explanation.

In the equation (5), if the spectrums of both the desired signal and the interferer are not identical, the second and third terms can be varnished by time averaging in the time average calculation circuit 16b or a low pass filter. As a result, only the first and fourth terms will remain.

As aforementioned, the time-average calculation circuit 16b outputs the computed time averaged values to the memory and subtraction circuit 16c when it detects that the burst period is ended (when it detects that it is during an interval of bursts) based upon the applied burst timing information. Simultaneously to this, the circuit 16b once resets the data relating to the time-average calculation and starts new calculation of the time-averaged values. Then, when the circuit 16b detects that it is the time period of burst based upon the applied burst timing information, it outputs the time averaged values calculated during the interval of bursts to the following memory and subtraction circuit 16c. The output at this time indicates the phase differences due to signals other than the desired signal such as burst signal. Therefore, the product of complex conjugate of the reference element output signal $X_0^*$ and the adjacent element output signal $X_1$ during an interval of burst is expressed as follows:

$$X_0^* X_1 = A_I e^{-j(\omega_I t + \phi_I)} A_I e^{j(\omega_I t + \phi_I + \alpha_I)} = A_I^2 e^{j\alpha_I} \quad (7)$$

The burst timing information detected by the burst-timing detection circuit 15 is also applied to the memory and subtraction circuit 16c as in the case of the time-average calculation circuit 16b. As aforementioned, the circuit 16b provides output representing the time averaged value of the phase differences during an interval of bursts at the start of burst, and provides output representing the time averaged values of the phase differences during burst at the end of the burst to the circuit 16c. The circuit 16c stores the received output once in the memory if the received output is that representing the time averaged values of the phase differences during burst at the end of the burst, and then subtracts the next received output at the start of burst, which represents the time averaged values of the phase differences during an interval of bursts, from the stored time averaged value. Since this calculation is equivalent to the subtraction of the equation (7) from the equation (5), phase differences of the desired signal can be obtained.

Thus obtained angles of the incident signals are applied to the spatial averaging circuit 16d. In case of a linear array antenna with three or more elements, a plurality of element pairs with the same spacing exist. Therefore, the angles of the incident signals estimated by these equal spacing element pairs are applied to the spatial averaging circuit 16d to obtain spatial averages of the incident signal angles in order to improve the accuracy of the DOA estimation.

For the DOA estimation, it is desired to use the phase differences from not only the element pairs with the equal spacing but also another element pairs with different spacings.

The linear array antenna in general has a plurality of antenna elements aligned with equal spacing. Thus, in each linear array antenna, there exist not only the minimum spacing element pairs but also element pairs with spacings as much as integer multiples of the minimum spacing. Because of physical locations of the elements, the phase differences produced by the integer multiple spacing element pairs are the integer multiples of the phase difference produced by the minimum spacing element pair. In other words, the signal phase difference linearly varies in response to the spacing of the element pair. Therefore, in the spatial averaging circuit 16d, a linear regression line representing the relationship between the element spacing (distance of elements) and the phase difference is calculated by using all the phase difference information detected with respect to all the available element spacings. Since this regression line is equivalent to a set of amended values of phase difference information separately obtained for each element spacing by using the phase different information of all the available element spacings, the accuracy of the phase difference detection which may deteriorate due to lowered S/N can be improved by this calculation.

Figure 3:
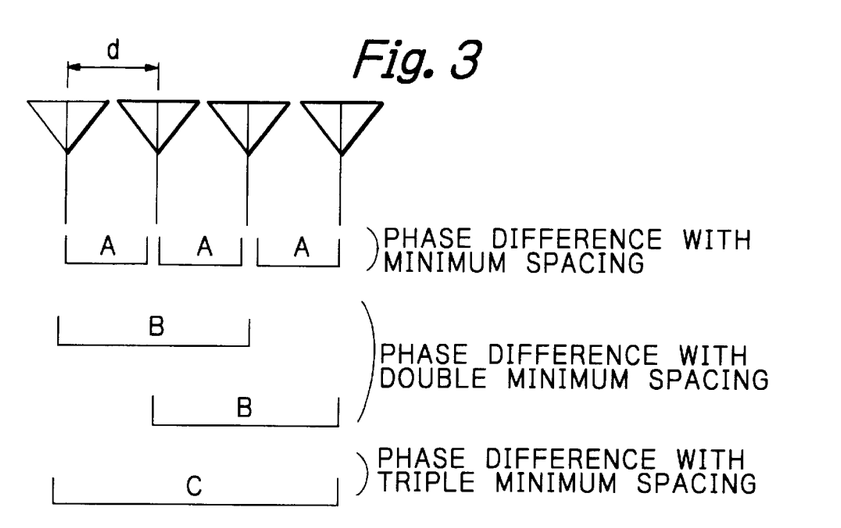
FIG. 3 shows a four elements linear array for illustrating the concept of spatial averaging.
Figure 4:
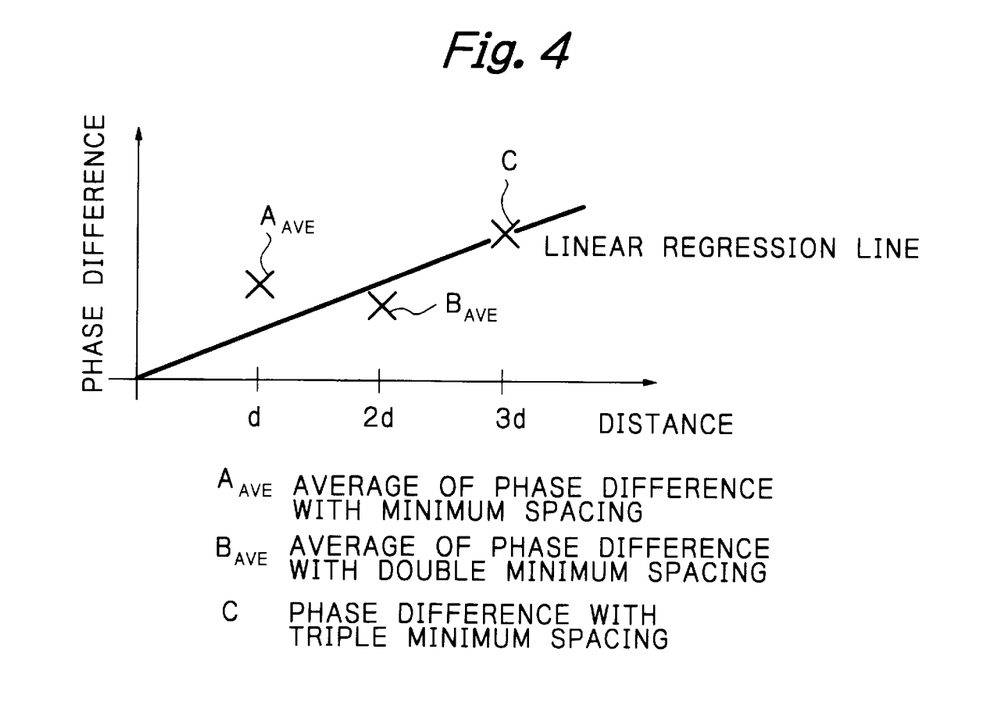
FIG. 4 shows a relationship between spacing of the elements and phase difference for illustrating the concept of spatial averaging.

Hereinafter, the averaging calculation in the circuit 16d will be explained in detail by using an example of a linear array antenna with four elements aligned with a spacing of a half wave length by using FIGS. 3 and 4. As shown in FIG. 3, three phase difference information A with the minimum spacing, two phase difference information B with the double minimum spacing, and one phase difference information C with the triple minimum spacing can be obtained. An average $A_{AVE}$ of the three phase difference information A and an average $B_{AVE}$ of the two phase difference information B are calculated. Thus, three data $A_{AVE}$, $B_{AVE}$ and C can be obtained. By plotting these three data on a graph in which the horizontal axis indicates distance between elements and the longitudinal axis indicates the phase difference, a linear regression line can be obtained as shown in FIG. 4. The values on or adjacent to the line represent the aforementioned amended values of phase difference information separately obtained for each element spacing by using the phase different information of all the available element spacings.

Thus obtained phase differences of the respective element spacings with respect to the reference element are provided as DOA estimation values (steering vectors) from the spatial averaging circuit 16d to the weight calculation circuit 18 via the non-burst condition DOA estimation circuit 17.

Figure 5:
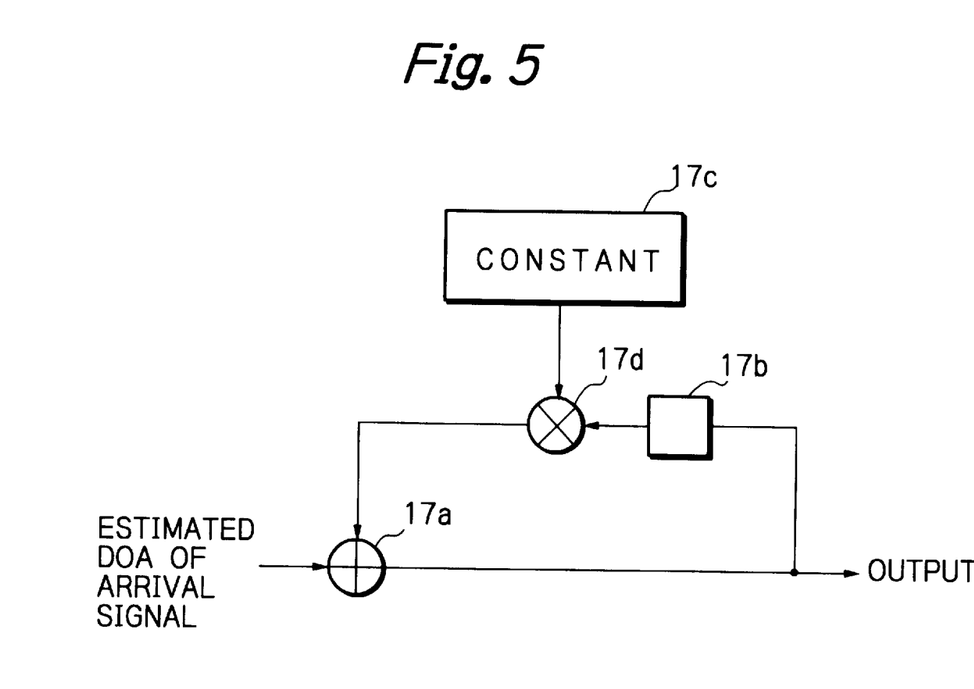
FIG. 5 shows a block diagram of an example of a DOA estimation circuit used at non-burst condition according to the embodiment shown in FIG. 1.

In FIG. 5 which illustrates an example of the DOA estimation circuit used at non-burst condition 17, reference numeral 17a denotes an adder for adding the input DOA estimation value with the value of the output signal from a multiplier 17d, 17b denotes a delay element for delaying the output signal from the adder 17a, 17c denotes a constant generator, and 17d denotes the multiplier for multiplying the value of the delayed output signal from the delay element 17b by a constant from the constant generator 17c, respectively.

If the array antenna is mounted on a mobile communication terminal, no burst may be temporarily received due to a hindrance. During such period of time, it is impossible to correctly estimate the DOA causing no weight to be obtained. To solve this problem, the non-burst condition DOA estimation circuit 17 with a feedback loop is provided. The DOA estimation value applied to the feedback loop is delayed by the delay element 17b by a time period equal to an interval of estimated value outputs, then multiplied by a predetermined constant from the constant generator 17c, and thereafter added to the next DOA estimation value. The predetermined constant from the generator 17c is adjusted to a value from 0 to 1 depending upon its transmission environment of radio wave.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of controlling an array antenna having a plurality of antenna elements for providing antenna output signals by receiving TDMA burst signals, comprising the steps of:

estimating a DOA of incident signal based upon the antenna output signals;

calculating weights with reference to the estimated DOA;

multiplying the antenna output signals by the calculated weights, respectively; and summing the multiplied antenna output signals, wherein said estimating step includes a first step of calculating a phase difference between the output signals of two of the antenna elements during burst, a second step of calculating a phase difference between the output signals of two antenna elements during an interval of bursts, and a third step of calculating a difference between said calculated phase differences.

2. The method as claimed in claim 1, wherein said first step includes a step of calculating a time average of the phase difference between the output signals of the two antenna elements during burst, and wherein said second step includes a step of calculating a time average of the phase difference between the output signals of the two antenna elements during an interval of bursts.

3. The method as claimed in claim 2, wherein said third step includes a step of temporally storing one of said calculated phase differences, and a step of calculating a difference between the stored phase difference and the other one of said calculated phase differences.

4. The method as claimed in claim 1, wherein one of said antenna elements is determined to be a reference antenna element, wherein said first step includes a step of calculating the product of $X_0^* X_1$, where $X_0^*$ is a complex conjugate of the output signal from the reference antenna element during burst, and $X_1$ is the output signal of the antenna element adjacent to the reference antenna element during burst, and wherein said second step includes a step of calculating the product of $X_0^* X_1$, where $X_0^*$ is a complex conjugate of the output signal from the reference antenna element during an interval, of bursts, and $X_1$ is the output signal of the antenna element adjacent to the reference antenna element during an interval of bursts.

5. The method as claimed in claim 4, wherein said first step includes a step of calculating the product of:

$$X_0^* X_1 = A_D^2 e^{j\alpha_D} + A_D A_I e^{j[(\omega_I - \omega_D)t + (\phi_I - \phi_D) + \alpha_I]} + A_D A_I e^{j[(\omega_D - \omega_I)t + (\phi_D - \phi_I) + \alpha_D]} + A_I^2 e^{j\alpha_I}$$

where $A_D$ and $A_I$ are amplitude, $\omega_D$ and $\omega_I$ are angular carrier frequency, and $\phi_D$ and $\phi_I$ are the sum of initial phase and modulation phase, suffixes D and I are a desired signal and an interferer, and $\alpha_D$ and $\alpha_I$ are phase differences from the reference antenna element caused by $\theta_D$ and $\theta_I$ of:

$$\alpha_D = 2\pi d \sin \theta_D / \lambda$$

$$\alpha_I = 2\pi d \sin \theta_I / \lambda$$

where $\theta_D$ and $\theta_I$ are angles of arrival of the desired signal and the interferer, d is a distance between the reference antenna element and the adjacent antenna element, and $\lambda$ is a wave length of the incident signal, and wherein said second step includes a step of calculating the product of:

$$X_0^* X_1 = A_I e^{-j(\omega_I t + \phi_I)} A_I e^{j(\omega_I t + \phi_I + \alpha_I)} = A_I^2 e^{j\alpha_I}.$$

6. The method as claimed in claim 1, wherein said method further comprises a step of detecting a TDMA slot timing in accordance with the antenna output signals, and a step of judging whether it is burst or an interval of bursts by using the detected TDMA slot timing.

7. The method as claimed in claim 1, wherein said estimating step includes a fourth step of estimating a DOA based upon phase differences of a plurality of element pairs having the same spacing, and a fifth step of calculating spatial average of the estimated DOA.

8. The method as claimed in claim 1, wherein said estimating step includes a fourth step of estimating a DOA based upon phase differences of a plurality of element pairs having different spacings, and a fifth step of calculating spatial average of the estimated DOA.

9. The method as claimed in claim 1, wherein said method further comprises a step of adding a feedback value to the estimated DOA to produce a sum, a step of delaying the sum, and a step of multiplying the delayed sum by a predetermined constant to produce said feedback value, said sum being provided as the estimated DOA.

10. An apparatus for controlling an array antenna having a plurality of antenna elements for providing antenna output signals by receiving TDMA burst signals, comprising:

means for estimating a DOA of incident signal based upon the antenna output signals;

means for calculating weights with reference to the estimated DOA;

means for multiplying the antenna output signals by the calculated weights, respectively; and means for summing the multiplied antenna output signals, wherein said estimating means includes a first means for calculating a phase difference between the output signals of two of the antenna elements during burst, a second means for calculating a phase difference between the output signals of two antenna elements during an interval of bursts, and a third means for calculating a difference between said calculated phase differences.

11. The apparatus as claimed in claim 10, wherein said first means includes means for calculating a time average of the phase difference between the output signals of the two antenna elements during burst, and wherein said second means includes means for calculating a time average of the phase difference between the output signals of the two antenna elements during an interval of bursts.

12. The apparatus as claimed in claim 11, wherein said third means includes means for temporally storing one of said calculated phase differences, and means for calculating a difference between the stored phase difference and the other one of said calculated phase differences.

13. The apparatus as claimed in claim 10, wherein one of said antenna elements is determined to be a reference antenna element, wherein said first means includes means for calculating the product of $X_0^* X_1$, where $X_0^*$ is a complex conjugate of the output signal from the reference antenna element during burst, and $X_1$ is the output signal of the antenna element adjacent to the reference antenna element during burst, and wherein said second means includes means for calculating the product of $X_0^* X_1$, where $X_0^*$ is a complex conjugate of the output signal from the reference antenna element during an interval of bursts, and $X_1$ is the output signal of the antenna element adjacent to the reference antenna element during an interval of bursts.

14. The apparatus as claimed in claim 13, wherein said first means includes means for calculating the product of:

$$X_0^* X_1 = A_D^2 e^{j\alpha_D} + A_D A_I e^{j[(\omega_I - \omega_D)t + (\phi_I - \phi_D) + \alpha_I]} + A_D A_I e^{j[(\omega_D - \omega_I)t + (\phi_D - \phi_I) + \alpha_D]} + A_I^2 e^{j\alpha_I}$$

where $A_D$ and $A_I$ are amplitude, $\omega_D$ and $\omega_I$ are angular carrier frequency, and $\phi_D$ and $\phi_I$ are the sum of initial phase and modulation phase, suffixes D and I are a desired signal and an interferer, and $\alpha_D$ and $\alpha_I$ are phase differences from the reference antenna element caused by $\theta_D$ and $\theta_I$ of:

$$\alpha_D = 2\pi d \sin \theta_D / \lambda$$

$$\alpha_I = 2\pi d \sin \theta_I / \lambda$$

where $\theta_D$ and $\theta_I$ are angles of arrival of the desired signal and the interferer, d is a distance between the reference antenna element and the adjacent antenna element, and $\lambda$ is a wave length of the incident signal, and wherein said second means includes means for calculating the product of:

$$X_0^* X_1 = A_I e^{-j(\omega_I t + \phi_I)} A_I e^{j(\omega_I t + \phi_I + \alpha_I)} = A_I^2 e^{j\alpha_I}.$$

15. The apparatus as claimed in claim 10, wherein said apparatus further comprises means for detecting a TDMA slot timing in accordance with the antenna output signals, and means for judging whether it is burst or an interval of bursts by using the detected TDMA slot timing.

16. The apparatus as claimed in claim 10, wherein said estimating means includes a fourth means for estimating a DOA based upon phase differences of a plurality of element pairs having the same spacing, and a fifth means for calculating spatial average of the estimated DOA.

17. The apparatus as claimed in claim 10, wherein said estimating means includes a fourth means for estimating a DOA based upon phase differences of a plurality of element pairs having different spacings, and a fifth means for calculating spatial average of the estimated DOA.

18. The apparatus as claimed in claim 10, wherein said apparatus further comprises means for adding a feedback value to the estimated DOA to produce a sum, means for delaying the sum, and means for multiplying the delayed sum by a predetermined constant to produce said feedback value, said sum being provided as the estimated DOA.

19. An apparatus for controlling an array antenna having a plurality of antenna elements for providing antenna output signals by receiving TDMA burst signals, comprising:

means for estimating a DOA of incident signal based upon the antenna output signals;

means for calculating weights with reference to the estimated DOA;

means for multiplying the antenna output signals by the calculated weights, respectively; and means for summing the multiplied antenna output signals, wherein said estimating means includes means for calculating phase differences between the output signals of two of the antenna elements, means for calculating a spatial average of the calculated phase differences during burst, means for calculating a spatial average of the calculated phase differences during an interval of bursts, and means for calculating a difference between said calculated spatial averages of phase differences.

* * * * *